United States Patent [19]

Chin et al.

[11] Patent Number: 5,295,052
[45] Date of Patent: Mar. 15, 1994

[54] LIGHT SOURCE ASSEMBLY

[75] Inventors: Noelle S. Chin, Shrewsbury; Ernest E. Beland, Jr., Hudson, both of Mass.

[73] Assignee: Luxtec Corporation, Worcester, Mass.

[21] Appl. No.: 959,935
[22] Filed: Oct. 9, 1992
[51] Int. Cl.[5] ............................................. F21V 8/00
[52] U.S. Cl. ..................................... 362/32; 362/294; 362/362
[58] Field of Search ............... 362/32, 261, 263, 285, 362/372, 362, 294, 264, 373

[56] References Cited

U.S. PATENT DOCUMENTS

| | | | |
|---|---|---|---|
| 3,496,931 | 2/1970 | Pilling | 128/6 |
| 3,581,376 | 6/1971 | Pilling | 29/419 |
| 3,597,647 | 8/1971 | Rishton | 313/110 |
| 3,775,606 | 11/1973 | Bazell et al. | 362/32 |
| 3,996,494 | 12/1976 | Suga | 315/151 |
| 4,110,820 | 8/1978 | Konoshima | 362/32 |
| 4,219,221 | 6/1993 | Yamaka et al. | 362/294 |
| 4,464,705 | 8/1984 | Horowitz | 362/12 |
| 4,589,404 | 5/1986 | Barath et al. | 128/6 |
| 4,613,926 | 9/1986 | Heitman et al. | 362/32 |
| 4,613,931 | 9/1986 | Messinger | 362/32 |
| 4,619,249 | 10/1986 | Landry | 128/23 |
| 4,620,266 | 10/1986 | Baumann et al. | 362/32 |
| 4,624,562 | 11/1986 | Buck et al. | 356/73.1 |
| 4,697,870 | 10/1987 | Richards | 350/96.20 |
| 4,730,895 | 3/1988 | Siedband et al. | 350/96.24 |
| 4,753,530 | 6/1988 | Knight et al. | 356/73 |
| 4,754,328 | 6/1988 | Barath et al. | 358/98 |
| 4,763,668 | 8/1988 | Macek et al. | 128/751 |
| 4,816,975 | 3/1989 | Bahnemann et al. | 362/32 |
| 4,860,172 | 8/1989 | Schlager et al. | 362/32 |
| 4,868,383 | 9/1989 | Kurtz et al. | 250/228 |
| 4,883,333 | 11/1989 | Yanez | 350/96.10 |
| 4,887,154 | 12/1989 | Wawro et al. | 362/294 |
| 4,887,190 | 12/1989 | Sadamune et al. | 362/32 |
| 4,957,346 | 9/1990 | Wood et al. | 350/96.26 |
| 4,958,263 | 9/1990 | Davenport et al. | 362/32 |
| 5,005,180 | 4/1991 | Edelman et al. | 372/57 |
| 5,029,117 | 7/1991 | Patton | 364/557 |
| 5,037,421 | 8/1991 | Boutacoff et al. | 606/15 |
| 5,038,260 | 8/1991 | Scheibengraber | 362/268 |
| 5,043,285 | 8/1991 | Surgi | 436/136 |
| 5,066,295 | 11/1991 | Kozak et al. | 606/47 |
| 5,111,367 | 5/1992 | Churchill | 362/32 |
| 5,230,555 | 7/1993 | Stephenson et al. | 362/32 |

OTHER PUBLICATIONS

Product Brochure entitled "Series 1900 Xenon Light Source," 2-sided glossy sheet, of Luxtec Corporation, 326 Clark Street, Worcester, Mass. 01606-1214, copyright 1992.

Product Brochure entitled "Now You Can Have Complete Control Over Your Operating Light," 4-sided glossy folder, of Luxtec Corporation, 326 Clark Street, Worcester, Mass. 01606-1214, (undated).

Primary Examiner—Richard R. Cole
Assistant Examiner—L. Heyman
Attorney, Agent, or Firm—Weingarten, Schurgin, Gagnebin & Hayes

[57] ABSTRACT

A chassis for a light source for medical/surgical applications comprises a lamp assembly having a support plate slidable through a housing door into chassis mounted rails or slides and having fixed thereon lamp heat sinks having the form of mounting plates with heat dispersing fins projecting therefrom. The supporting plate further includes or supports plugs which mate with corresponding plugs in the rear as the plate is inserted on the rails and pushed back onto stops, providing secure, aligned positioning. The heat sinks that hold the lamp in position are slotted so as to resiliently secure and electrically contact the lamp under the action of first and second resilient clamps which position the lamp in predetermined alignment and allow for thermal expansion, for example, of the sapphire window. Light from the lamp is projected along a path through heat filters to an output turret assembly which allows for selection of different fiber optic cables connected to plural connectors on the turret. An attenuator in the beam path cooperative with manual and automatic controls allows adjustment of the light intensity manually or from an automated source such as a video camera seeing a field of view illuminated by light provided from the source through a connected fiber optics system. A printed circuit board is located in a part of the system partially separated by an air baffle. First and second fans apply cooling air from one rear panel portion across the optics and around the baffle over the power supply circuit board and out through louvers in an opposite rear panel portion.

9 Claims, 4 Drawing Sheets

LIGHT SOURCE ASSEMBLY

FIELD AND BACKGROUND OF THE INVENTION

Light sources are known for medical applications such as endoscopic viewing or surgery or illumination of headlamps worn by a surgeon or other medical operative on a headband. Such devices typically utilize a high intensity Xenon, halogen or other gas lamp which applies an intense light beam into an optical fiber cable through a turret assembly that allows selection of one of plural cables to receive the light. The cables transmit the light to utilization instrumentation. Losses are associated with the transmission via cable and through the instrumentation including transmission through endoscopic equipment, so that the provision of maximum light intensity of chromatically uniform spectral light is desirable. In medical applications, high reliability is also critical. In addition, such high intensity light sources have a relatively short life expectancy. This requires that surgical operations be backed up with spare supplies of light sources to fill in when a light source burns out during a procedure. This necessitates a large inventory of equipment, the more so because replacement of lamps requires return of the equipment to a factory or distributor setting where a new lamp can be installed and adjusted for proper alignment. Because the operating temperature of the lamp itself is high, the lamp tends to expand against its mounting restraints which raises a danger of breakage of such brittle components as sapphire lamp windows.

Because of the proliferation of medical equipment gathered around the limited space at a patient operating site, minimal dimensions for any instrumentation such as light sources becomes important. Such a trade-off is contrary to good heat dissipation principles in view of the substantial heat created in 150 and 300W lamps confined within small spaces.

BRIEF SUMMARY OF THE INVENTION

The present invention teaches a low profile light source for directing focused and aligned illumination into a selected one of the plurality of fiber optic cables mounted on a turret. Light is applied to the optical cable selected in the turret along a light path from a high intensity 300W Xenon lamp through a cooling filter having both visible light reflecting and transmitting lenses which exclude infrared, heat radiation by respective transmission and reflection. The lamp is mounted between respective front and rear heat sinks that are fixed on a support plate which is channeled in rails of a chassis to permit sliding in and out through a front door removable from the instrument face. The heat sinks contact respective lamp terminals and have electrical connections to wires which are powered from an igniter. The rails provide a predetermined stop point for the support plate and supported lamp to permit lamp replacement while maintaining lamp alignment along the optical path and male/female plug pairs secure the support plate in correct alignment.

The sinks have the form of finned mounting plates are slotted through apertures for the lamp itself from one edge nearly to an opposite edge and are then clamped about the lamp by resilient clamps which allow hinged expansion of the support plates as the lamp expands from heat during its operation and cause the heat sinks to securely make electrical contact at each lamp electrode.

The light path also includes a light beam attenuator having manual and automatic controls and may include a video processor board for generating automatic control of the attenuation in response to video output signals from a camera seeing the field of view illuminated by light from the lamp.

Separated from the optical path by an air baffle is a power supply mounted on a circuit board for generating electrical power which operates the various electrical components of the light source. First and second rear panel fans cause cooling air to flow over optical components, around a baffle and over the power supply to a rear panel exhaust port to allow it to maintain an operating temperature within its relatively low temperature range.

BRIEF DESCRIPTION OF THE DRAWING

These and other feature of the present invention are described more completely below in the solely exemplary detailed description and accompany drawing of which.

DETAILED DESCRIPTION

The present invention contemplates a low profile light source having a slideout, replaceable lamp assembly and resilient clamp for accommodating thermal expansion as well as partitioned and fan cooled circuit board and optical portions.

Figure 1:
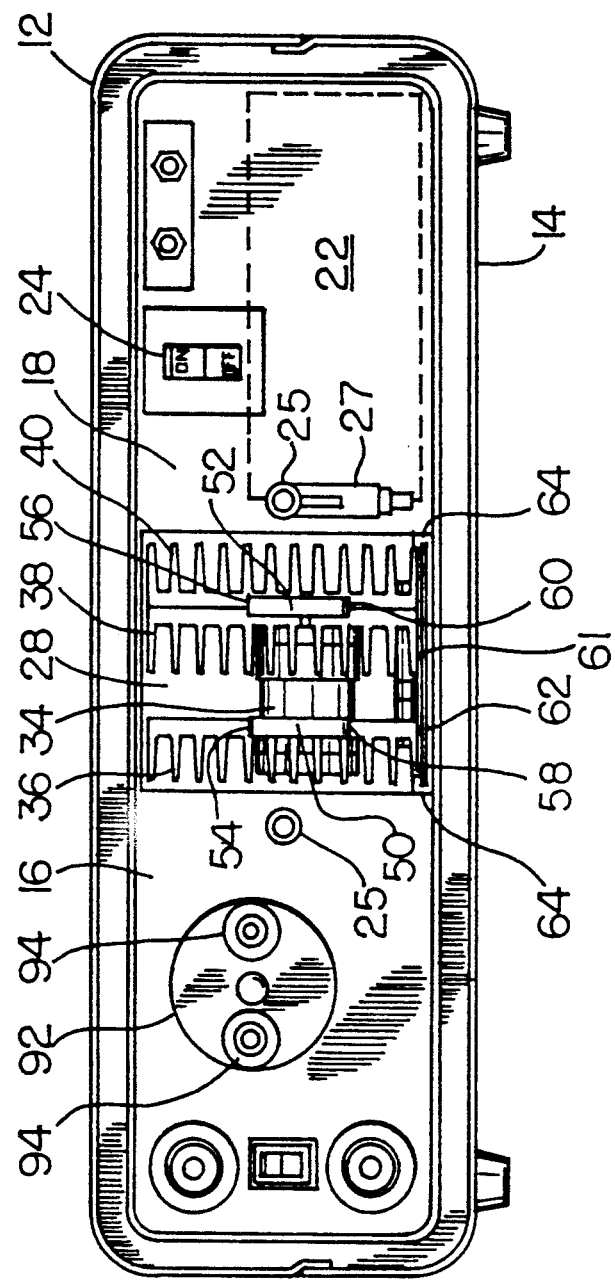
FIG. 1 is a front panel view of a light source according to the invention.
Figure 3:
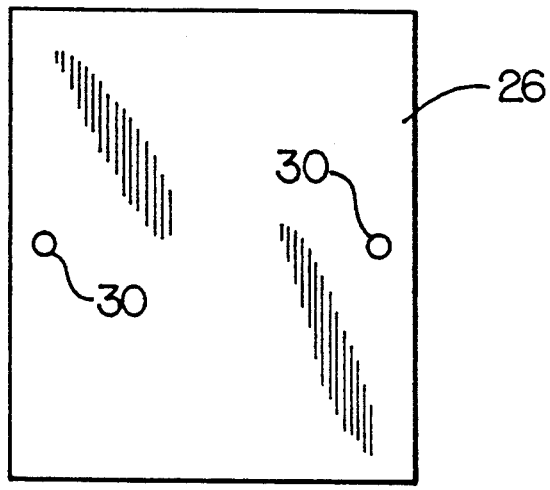
FIG. 3 is a view of a cover panel for a portion of the front panel of FIG. 1 behind which the lamp assembly is removably installed.
Figure 4:
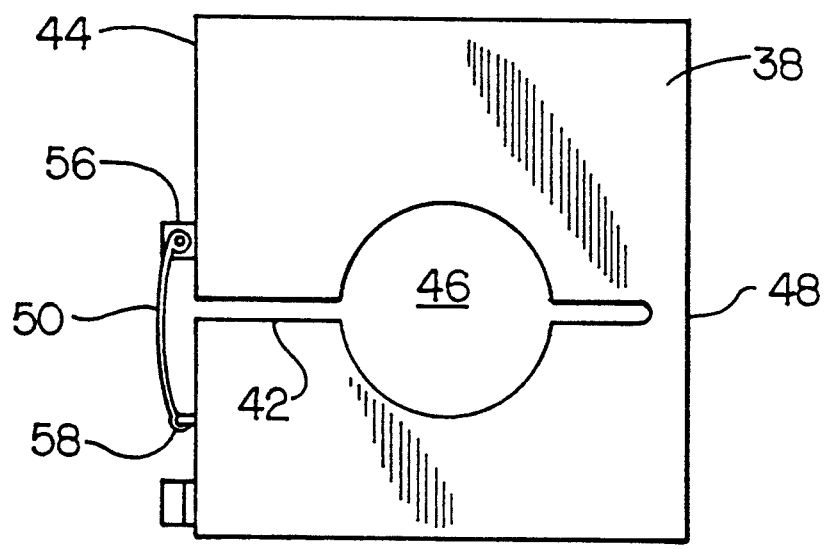
FIG. 4 is an elevation view of the side of a lamp heat sink and associate resilient clamp and installation handle according to the invention.

In particular, and by reference to FIG. 1, there is shown a front view of a low profile light source having top and bottom portions 12 and 14 of a housing and a front plate 16. The right most portion 18 of the front plate 16 covers a power supply 22 mounted on a circuit board and controlled by an on/off switch 24 to turn on and off the entire light source. In the portion to the left of the right portion 18 is a removed panel 26, shown in FIG. 3, which covers an opening 28 and is attached thereto by screws 25 through holes 30 in panel 26. One screw 25 has an interlock 27 to cut unit power when removed. Shown through the aperture 28 is a lamp assembly 80 comprising a 300W Xenon lamp 34 supported by heat sinks having the form of mounting plates with fins providing heat sinking to an airflow passing therethrough as described below. The heat sinks, as further shown in FIG. 4 showing a representative heat sink 38, have a slot 42 cut from a front edge 44 through an aperture 46 for the lamp 34 to a position proximate to a back edge 48. First and second clamps 50 and 52 extend from upper attachment points 54 and 56 to bottom releasable clip positions 58 and 60. The clamps 50 and 52 provide resilient closure of the slot 42 upon the lamp in aperture 46 securely positioning it and making electrical contact to its terminals but allowing for thermal expansion so that the delicate sapphire front face of the typical Xenon lamp is not cracked under the stresses of thermal expansion.

The heat sinks 36, 38 and 40 are mounted on a phenolic 61 plate which in turn is mounted on a bottom support plate 62 which is accepted into rail slots of a bottom guide member 64 to allow sliding in and out of the entire assembly thus formed by use of a handle 66 on the front of the mounting plates. Plate 62 is apertured where screws hold it to the heat sinks for electrical insulation. Electrical connectors 68 and 70 are attached to the rear of the heat sinks 36 and 38 and are cable attached to an ignitor 67. Plugs 69 and 71 mate with sockets 72 and 74, shown in FIG. 2, to secure plate 62 as it is slid in and out on the rails of support member 64. Support member 64 typically has the rail slots terminate at a predetermined position to provide consistent depth alignment for each lamp 34 slid in and out to provide for rapid, in the field, replacement of burned out lamps without the necessity for return of the light source to the factory for replacement and realignment.

Figure 2:
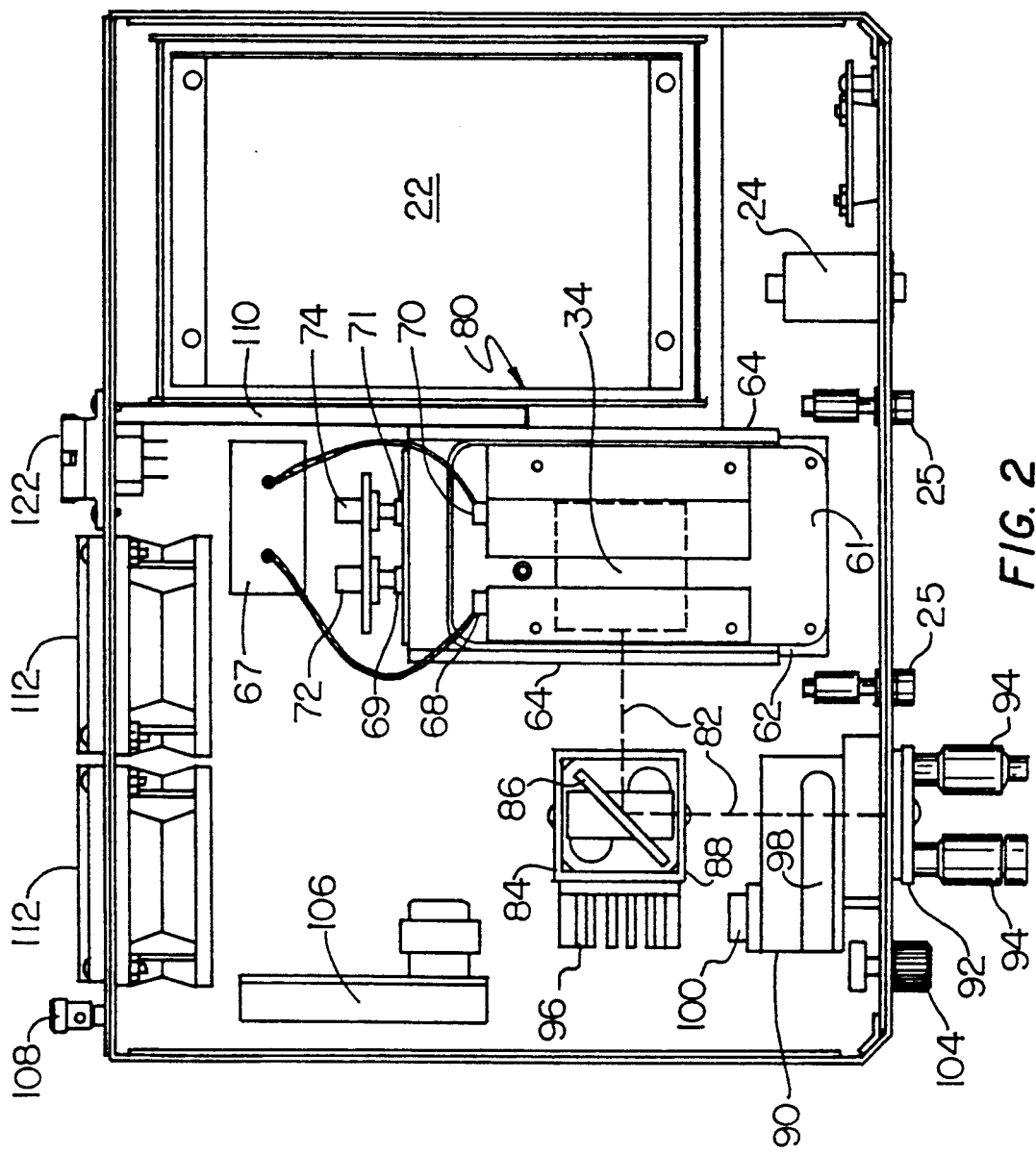
FIG. 2 is a top, chassis layout view of the internal structure of a light source according to the invention.

With reference now to FIG. 2, the interior and chassis, in top view is shown of the light source of the present invention. The light assembly 80 formed by the aligned mounting of the light source 34 in the heat sinks 36, 38 and 40 on the support plate 62 projects light onto a light path 82 to a heat filter 84 comprising a first, visible light reflecting and IR light transmitting plate 86, thence through a visible light transmitting and infrared light reflecting further plate 88 to an attenuator 90 and finally to a turret 92 having a plurality of light cable connectors 94 to permit rotational selection of a desired optical cable for injection of light from the source 34. The heat filter 84 further contains rear cooling fins 96.

Within the attenuator 90, a rotating vein 98 is controlled by motor 100 for manual control of the attenuation through control 104 or automated control via a video board 106 which receives video signals from a connector 108 connected to a video camera seeing the field of view illuminated from the source and providing automated feedback control of the light intensity as is known in the art.

Fans 112 direct cooling, air from the left rear panel area over the light emitting and processing components around a baffle 110 and across the power supply 22.

Electrical input for powering the light source is provided from an RF filtered plug 122 to the power supply 22 and is activated by switch 24. The power supply in turn powers ignitor 67 which applies an initial, brief high voltage to the lamp 34 via connectors 68 and 70 to initially activate the Xenon discharge and to thereafter provide a maintenance supply of electrical energization as is known in the art.

Figure 5:
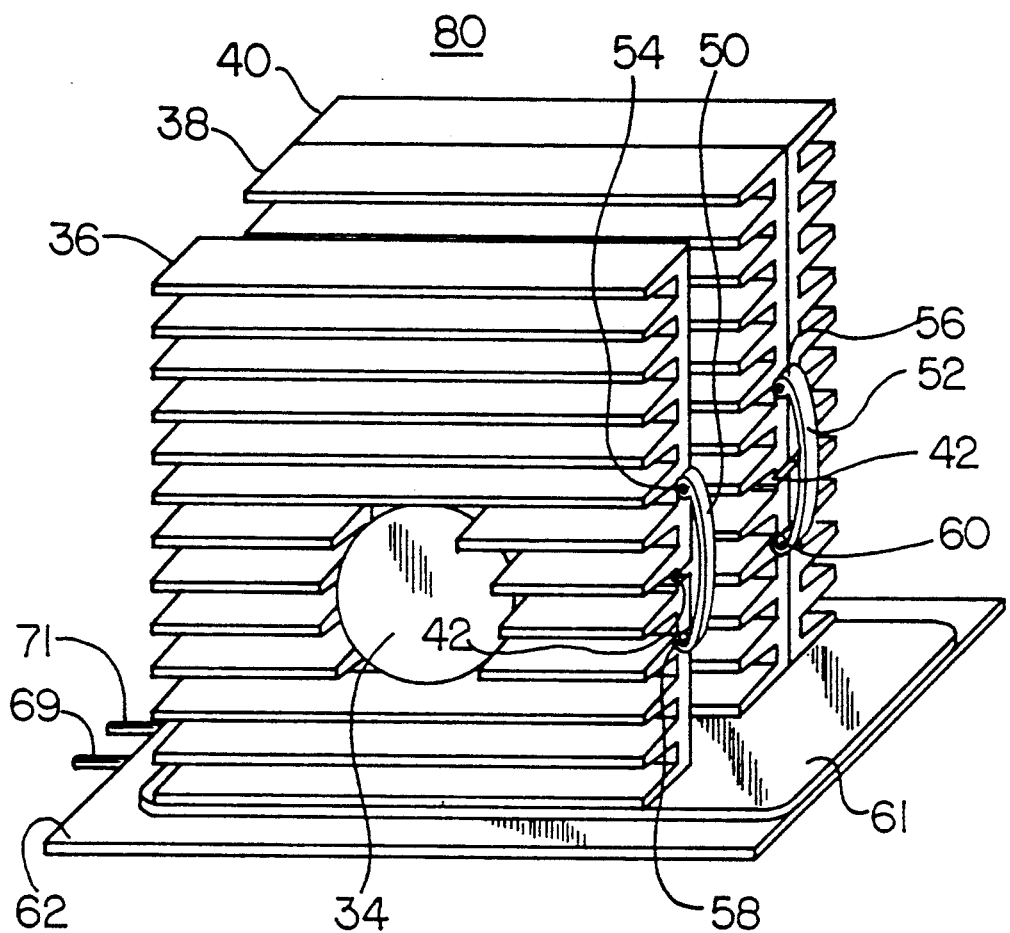
FIG. 5 is a perspective view of a lamp assembly according to the invention.

In FIG. 5, the heat sinks 36, 38, 40 are further illustrated in relation to the Xenon lamp 34, the phenolic plate 61, and the bottom support plate 62. The first clamp 50 extends from the upper attachment point 54 to the bottom releasable clip position 58, spanning the slot 42 and resiliently closing the heat sink 36 about the lamp 34. Similarly, second clamp 52 extends from the upper attachment point 56 to the bottom releasable clip position 60, resiliently closing heat sinks 38, 40 about the lamp 34.

The above described preferred embodiment is present for purposes of illustration, the scope of the claims to be determined solely by reference to the following claims.

We claim:

1. A light source for applying a high intensity cooled light to a fiber optic connection comprising:
   a chassis having thereon a lamp assembly and positioner defining one end of a light path;
   an optical fiber cable connector defining another end of said light path; and
   cooling filters in said light path intermediate said one and other ends;
   said positioner comprising at least first and second rails, each having first and second ends with respective stops, said first and second rails adapted to receive a support plate of said lamp assembly;
   said lamp assembly including, on said support plate, first and second lamp mounts, each lamp mount having cooling fins thereon;
   said chassis further including an electrical interconnect block having first and second electrical interconnect plugs, said support plate having thereon mating plugs;
   a cover surrounding said chassis and having a front plate thereon;
   a removable access plate in said front plate adapted to permit sliding of said lamp assembly support plate on said rails through an aperture in said front plate normally covered by said access plate to permit rapid replacement of said lamp assembly.

2. A light source for applying a high intensity cooled light to a fiber optic connection comprising:
   a chassis having thereon a lamp assembly and positioner defining one end of a light path;
   an optical fiber cable connector defining another end of said light path; and
   cooling filters in said light path intermediate said one and other ends;
   said positioner comprising at least first and second rails, each having first and second ends with respective stops, said first and second rails adapted to receive a support plate of said lamp assembly;
   said lamp assembly including, on said support plate, first and second lamp mounts, each lamp mount having cooling fins thereon;
   a power supply mounted in said chassis in a portion separate from said lamp assembly;
   an air baffle between the portion containing said power supply and said lamp assembly;
   first and second fans oriented to cool said lamp assembly and, around said air baffle, said power supply.

3. A light source for applying a high intensity cooled light to a fiber optic connection comprising:
   a chassis having thereon a lamp assembly and positioner defining one end of a light path;
   an optical fiber cable connector defining another end of said light path; and
   cooling filters in said light path intermediate said one and other ends;
   said positioner comprising at least first and second rails, each having first and second ends with respective stops, said first and second rails adapted to receive a support plate of said lamp assembly;
   said lamp assembly including, on said support plate, first and second lamp heat sinks in the form of mounting plates having cooling fins thereon;
   said mounting plates having a slot extending from one edge through an aperture dimensioned to hold a lamp proximate to a second opposite edge; and
   clamps resiliently holding parts of said heat sink on said first edge on either side of said slot together to thereby clamp securely in position said lamp and cause said heat sinks to make electrical contact thereto and allow thermal expansion thereof restrained by resilience of said resilient clamps.

4. The source of claims 1, 2 or 3 further including a filter including at least one of a light reflector and a light transmitter which separately transmit and reflect visible light and infrared radiation.

5. The source of claim 4 wherein said filter includes both visible light reflecting and invisible light transmitting elements.

6. The source of claims 1, 2 or 3 further including a controllable light attenuator in said path operative in response to a control signal.

7. The source of claim 6 wherein said controllable attenuator has controls responsive to a video signal and to manual adjustment for controlling the attenuation of light in said light path.

8. The source of claims 1, 2 or 3 wherein said power supply activates an igniter for a lamp in said lamp assembly.

9. The source of claim 3 wherein said lamp heat sinks comprise three finned plates, two positioned in back to back relationship with a single resilient clamp thereacross and a second resilient clamp across a third of said finned plates.

* * * * *